United States Patent Office 2,920,478
Patented Jan. 12, 1960

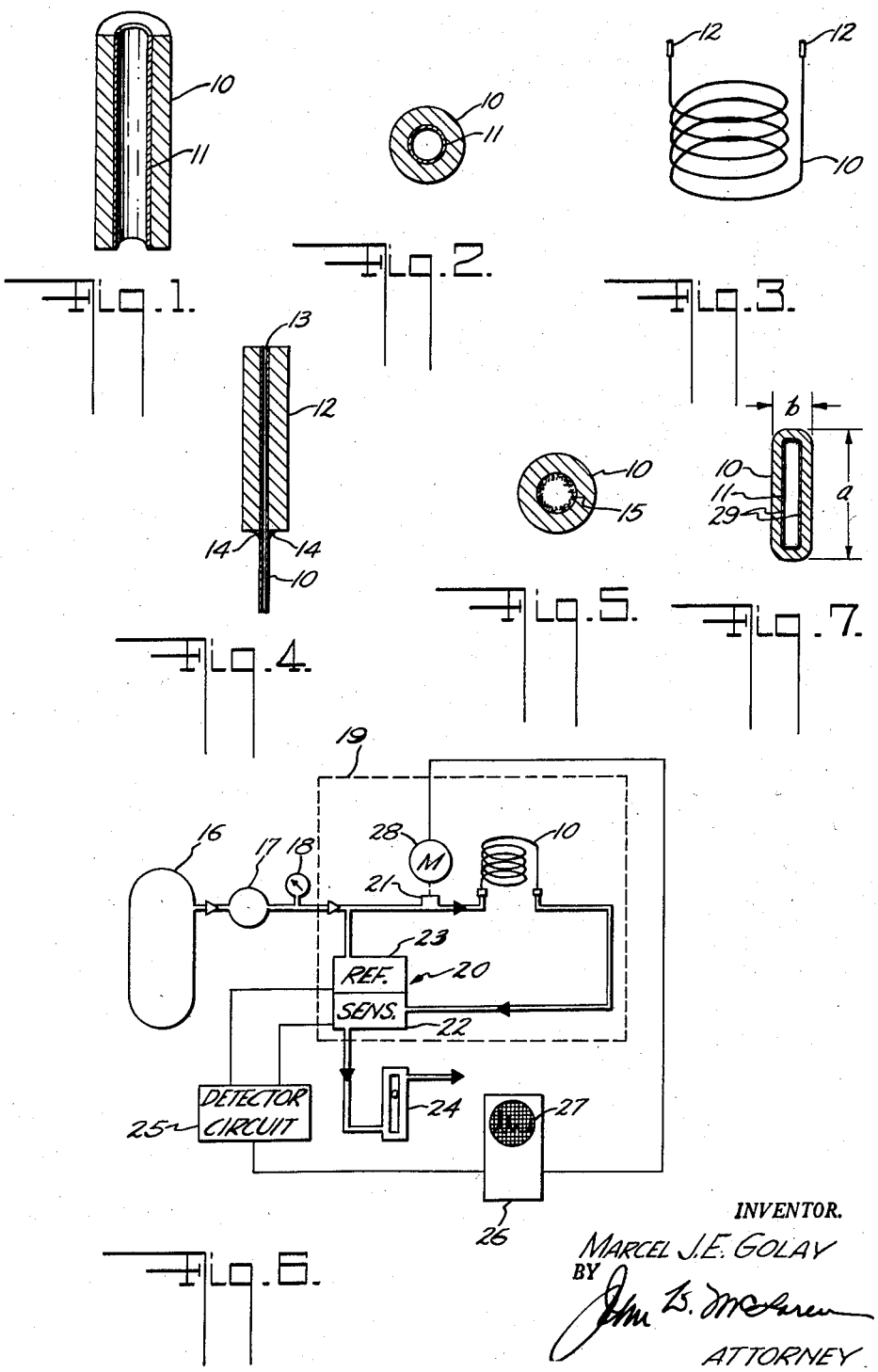

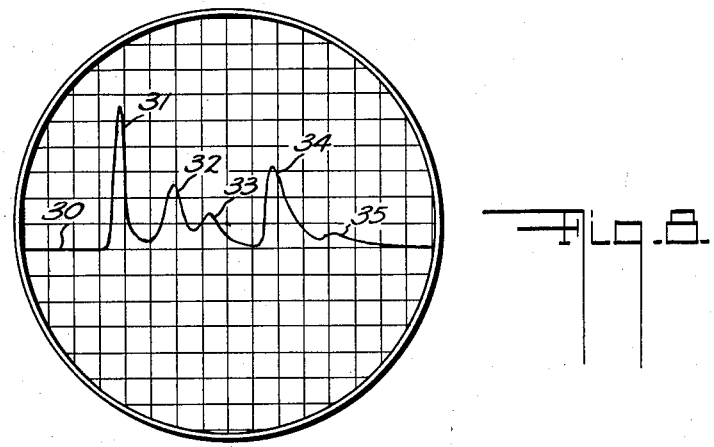
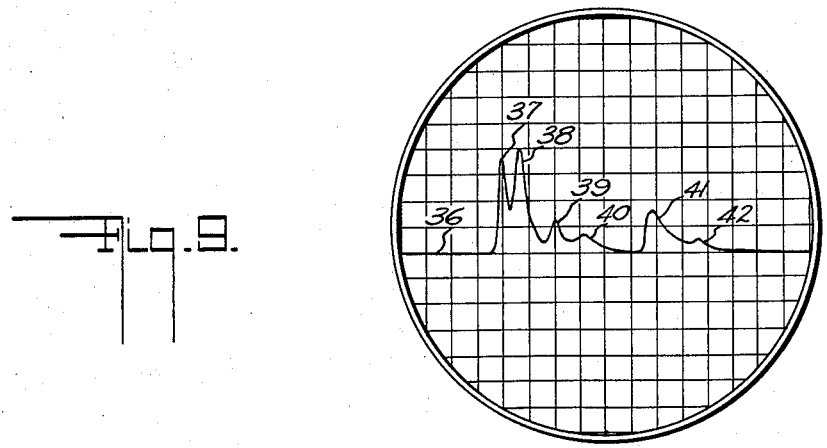
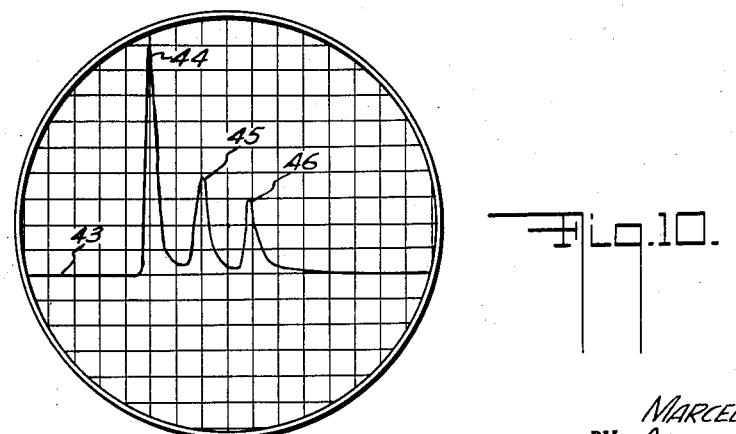

2,920,478

VAPOR FRACTOMETER COLUMN

Marcel J. E. Golay, Rumson, N.J., assignor to The Perkin-Elmer Corporation, Norwalk, Conn., a corporation of New York Application June 24, 1957, Serial No. 667,486

18 Claims. (Cl. 73—23)

The present invention is concerned with vapor fractionation apparatus and, more particularly, with a combination including a unique vapor fractometer column which produces unusual and highly desirable results. Vapor fractometry, also known as vapor phase chromatography, has become a widely used and versatile laboratory technique, and the present invention significantly broadens and extends its potential usefulness in industry as well as in scientific research.

Adsorption separation originated in the use of adsorption phenomena as applied to the separation of coloring matter in leaves. Later, substances were separated by using $H_2S$ to develop colors of salts in columns of alumina and the color indications of inorganic separations were called chromatograms. Thus, the early techniques produced a separation of colored substances whence the term "chromatography" became associated with the art. Later developments disassociated the color indicia from the separation techniques and, as analysis by vapor phase phenomena came into use, it became apparent that the term "vapor fractometry" is more accurately descriptive of the separation than "gas chromatography." Partition separation (as contrasted to displacement and frontal analysis) was developed into a useful laboratory research tool, and Martin and Synge suggested in 1941 that volatile materials, as well as liquids, might be separated by the use of columns having a stationary liquid phase and a moving gas phase. More recently, this latter technique, known as the elution-partition method of separation, has been perfected for qualitative and quantitative analysis of gas and liquid samples and a number of excellent instruments are now available commercially.

Vapor fractometry consists essentially in passing a sample mixture through a fractometric column, utilizing the different equilibria existing between a fixed phase partitioning agent and the respective components of the sample in mobile phase to separate its components. Whereas the fixed phase can be liquid or solid, the mobile phase can be gas or liquid. It is possible to use a number of different combinations in order to separate the constituents of a sample. For instance, one may use a gas-liquid combination, a gas-solid combination, a liquid-liquid combination, or a liquid-solid combination.

The present invention is concerned with the separation of the various components in a mixture by means of the gas-liquid technique (elution-partition) and the gas-solid technique (elution-adsorption). The sample and carrier gas are generally called the "mobile phase" and the column material is referred to as the "fixed phase" or as the "stationary phase." Both gas and liquid samples may be analyzed by the method. Liquid samples are merely vaporized and separated in gaseous state.

In vapor fractometry techniques, the separation of the components of a sample mixture takes place in a column, and commercially available conventional vapor fractometer columns may comprise a length of hollow tubing packed with an inert material such as celite or kieselguhr to act as a supporting structure for the liquid or fixed phase which comprises the operative component in the column. Such a column is used for effecting gas-liquid separation by the elution-partition technique. The column which is used for gas-solid or elution-adsorption separation is, by comparison, filled with a moderately adsorptive solid material such as silica gel in powder form and the packing itself is the operative component of the column.

A typical vapor fractometer column of either of these two types may be constructed of ¼" stainless steel or glass tubing in lengths of one or two meters. Some columns which are currently commercially available are formed in a U-shape or W-shape, while other columns are curved into a substantially helical configuration. For best vapor fractometer performance, the uniform size of the packing material in the conventional column has proved to be important, as also has the uniformity with which the material is packed throughout the length of the column.

The present invention contemplates a vapor fractometer column having no packing material. One form of the present invention comprises a hollow tube internally coated with a partitioning agent. For gas-liquid separation, the column is internally coated with a film of partitioning agent of the kind supported on the celite structure of a conventional prior art column. For gas-solid separation, the column is internally coated with an adsorbent material which may be in powder form. Another form of the present invention for gas-liquid separation consists of a hollow tube, the internal walls of which support a small thickness of loosely aggregated dendritic particles which are coated with a film of said partitioning agent.

Early developed instrumentation which employed adsorption phenomena for the separation of the components of a sample according to the physical characteristics of each, usually required several hours to complete such a separation. More recently, improved instrumentation, particularly of the elution-partition type, has made it possible to effect highly accurate separation of the constituents of a sample in a period of the order of twenty minutes.

Apparatus using the column of the present invention is capable of effecting separation of the components of the same kind of sample in a matter of seconds. Moreover, the enormously increased speed of operation is not realized by a sacrifice of accuracy but, on the contrary, the present invention produces separations exhibiting significantly increased resolution.

Vapor fractometry separation techniques now in general use require that the column be maintained at a temperature which is commensurate with and related to the vapor phase characteristics of the constituents in the sample undergoing separation. Prior art vapor fractometers using packed columns therefore have the inherent limitation of necessitating that the column be maintained at an appropriate temperature level for a period of time which is not infrequently of the order of 20 minutes. Samples which contain so-called "high boilers" required relatively high column temperatures to effect separation of the components of the sample. In conventional, packed, prior art columns, the relatively high temperature required for a comparatively long period of time sometimes resulted in pyrolysis of one or more constituents of the sample.

However, many of the high boilers can withstand the higher temperatures for a short period of time without breaking down. Consequently, the present invention, because it affords extremely rapid separation, makes it possible to employ significantly higher temperatures to separate the constituents of the samples which are among the high boilers. The present invention therefore affords analyses transcending the inherent limitations of conventional instrumentation.

The present invention will be better understood from the following description of specific embodiments which are also illustrated in the accompanying drawings.

In the drawings,

Fig. 1 is a cutaway view of one form of a vapor fractometer column of the present invention;

Fig. 2 is a cross-sectional view of the same form of column of the present invention;

Fig. 3 is an illustration of an entire column of the present invention;

Fig. 4 is a cross-sectional view of the end assembly of the capillary column of the present invention;

Fig. 5 is a cross-sectional view of another form of column embodying the present invention;

Fig. 6 is a schematic illustration of a vapor fractometer system embodying the present invention;

Fig. 7 is a cross-sectional view of another form of column of the present invention, and Figs. 8, 9, and 10 are typical cathode ray oscilloscope fractograms illustrating sample separations effected through use of the present invention.

A major difference between the widely used conventional vapor fractometer column and that of the present invention is the fact that the present invention does not employ a packed column such as is customarily used. In the conventional packed column, the entire void within the hollow tube is filled and packed.

The prior art elution-partition column is packed with an inert, nonabsorptive material to support a partitioning agent. This packing performs only a structural function.

The prior art elution-adsorption column is packed with a moderately adsorbent material which performs a function analagous to that of a partitioning agent.

In one form of the present invention, as illustrated in Figs. 1 and 2, the hollow tubing 10 which forms the column is coated with a partitioning agent 11. This partitioning agent may be liquid, such as polyethylene glycol 1200, or an appropriate solid such as silica gel.

A partitioning agent as used in elution-partition vapor fractometry must possess the quality of having a different physical affinity for each of the constituents to be separated in the sample. The partitioning agent must not enter into chemical reaction with any of the constituents contained in the sample, nor otherwise cause change in the physical and chemical properties of the sample componetns. A number of partitioning agents are currently in general use, and the selection of a suitable partitioning agent depends largely upon the problem to be solved.

As is shown in Fig. 2, the internal diameter of the column of the present invention is made smaller by the coating of the partitioning agent. The views of Figs. 1 and 2 are greatly enlarged in order to illustrate one form of the column of the present invention. It should be appreciated that the column of the present invention is of nearly capillary character. Moreover, the ratio of the length of the column to its internal diameter is very much greater than for conventional packed columns. For instance, columns having an inside diameter as large as fifty-five thousandths of an inch and as small as six thousandths of an inch have been successfully used to effect the rapid and accurate separation of the constituents of the sample in accordance with their physical characteristics, as taught by the concept of the present invention.

A typical vapor fractometer column of the present invention may, for instance, have an inside diameter of ten thousandths of an inch and be thirty-two feet long. It has been found that stainless steel tubing of the kind which is commercially available for the manufacture of hypodermic needles and the like is readily adaptable to provide the basic column structure of the present invention. Such column material is quite flexible and, thus, the extraordinary length of the column presents no problem in practical and convenient instrumentation. A typical column of the present invention is sufficiently flexible and resilient to be sprung into any convenient shape or configuration and is easily fitted into the controlled temperature bath space of conventional vapor fractometers in place of prior art packed columns. In one case, a chromatographic column of the present invention was provided by using a stainless steel tube of .01" internal diameter. A 1% solution of polyethylene glycol in methylene chloride was forced through the tube by a hypodermic syringe. One end of the filled tube was then closed off and the open end was moved slowly into an oven heated at 100° C. As the solvent evaporated, a thin coating of glycol was left on the inner wall of the tubing.

As illustrated in Fig. 3, the column 10 of the present invention may advantageously be fitted with end pieces 12 to facilitate its connection and adaptation to a vapor fractometer in lieu of the conventional ¼" diameter column.

As is illustrated in Fig. 4 (greatly enlarged), the end 13 of the capillary column 10 is fitted through a hole in an end piece 12, which may be a brass plug of the order of ¼" in diameter. The column 10 is affixed to each end piece by silver soldering or brazing the stainless steel tubing to the brass as illustrated at 14. The use of such end pieces 12 renders the column much easier to handle, and adapts it as a replacement for conventional vapor fractometer column in existing vapor fractometer instruments.

In accordance with the teaching of the present invention, the hollow interior of the tube may be rendered dendriform by an appropriate internal coating of inert material having an irregular surface or by deformation of the inside of the capillary tube itelf. Such an embodiment of the present invention is illustrated in the cross-sectional view of Fig. 5. The dendriform surface 15 of the tube 10 offers an increased surface area upon which the coating of partitioning agent may be deposited in accordance with the teaching of the present invention. A liquid film may be coated on the dendriform interior of the tube for one form of gas-liquid embodiment of the present invention, or for the gas-solid embodiment, the slightly adsorbent material having an irregular structure may be affixed to the inner surface of the hollow tube so that the solid adsorbent material is in itself substantially dendriform.

The size of the interior of the tube which forms the path for the flow of carrier gas and sample vapor is in such relation to the length of the column that extremely rapid separation of the constitutents of the sample is effected, whether the smooth interior surface, the dendriform interior surface, or the adsorbing granular coating of the tube is used. Certain advantages, however, inhere in the use of the dendriform interior which affords a greater surface area in contact with the flow of sample and carrier gases through the column.

A complete system embodying the present invention is illustrated in Fig. 6. In this system, a source of carrier gas 16 which may be helium under pressure, for instance, is connected through suitable gas regulation means 17 to the input side of the system. A pressure gauge 18 is connected to the input of the carrier gas to indicate gas pressure. A major portion of the path for the carrier gas is enclosed within a temperature-controlled chamber 19 which may be of the thermostated air bath type.

The column 10, a detector 20, and a sample injection means 21 of the system are schematically illustrated as being within the thermostated space 19.

In the particular system illustrated in Fig. 6, a detector, generally indicated at 20, is used which comprises two sections 22 and 23, a sensing section 22 detects thermal conductivity changes of the carrier gas due to the presence of constituents of the sample as they come off the column 10, and a reference section 23 to supply a reference signal. The reference section 23 is accordingly connected to respond to the carrier gas input and, thus, is capable of providing a reliable reference which will vary commensurately with the carrier gas input to the system.

Connected between the reference side 23 of the detector and the column 10, a sample injection means 21 is provided which may be similar to the type disclosed in Patent No. 2,757,541 issued to Emmett S. Watson et al. on August 7, 1956. The sample which is undergoing analysis is injected into the moving stream of carrier gas at this point and moves into and through the column 10 which, in Fig. 6, is schematically represented as a helically shaped tube for purposes of convenience and clarity. The column 10 may, of course, take numerous other configurations and still efficiently perform the function of separating the sample into a number of constituents which emerge from the column 10 at different times in accordance with their respective physical characteristics.

The sample constituents thus emerging from the column 10 are passed through the sensing side 22 of the detector where they are detected by thermal conductivity measurement in the case illustrated. Other appropriate means may be employed to detect the vapors emerging from the column, such as ionization voltage, or gas density balance, for example. From the sensing side 22 of the thermal conductivity detector 20, the sample components are passed through a flow meter 24 and may be either disposed of as waste or accumulated in an appropriate collecting system, if further analysis of the separated vapors is desired. The amount of each collected, for instance, may provide a sample for infrared analysis.

The reference side 23 and the sensing side 22 of the thermal conductivity detector 20 are connected to an appropriate electrical circuit 25 which may comprise a balanced bridge of the Wheatstone type. The electrical output signal of the bridge circuit is commensurate with the excess of the thermal conductivity of the vapor passing through the sensing side 22 of the detector 20 over the thermal conductivity of the carrier gas and is therefore indicative of the separated components of the sample as they emerge from the vapor fractometer column 10.

The column of the present invention produces such rapid separation of the constituents of the sample that the response of indicating and recording means customarily used with conventional vapor fractometers may be unsuitable for use in connection with the operation of the present invention. To use the extremely rapid results produced by the invention, the electrical output signal of a balanced bridge type of detector circuit may be fed to a special high-speed pen recorder or to a cathode ray oscilloscope 26, as illustrated in Fig. 6. In the latter case, the fractograms appear in the form of visual display on the face of the cathode ray tube 27.

A cathode ray tube having a relatively long-term persistance of luminescence will provide a fractogram during the full sweep of the cathode ray beam which may be of the order of 10 seconds, for instance. If it is desired to record the cathode-ray tube fractogram, a camera attachment may be used in conjunction with the cathode ray oscilloscope 26 so that the fractogram traced on the oscilloscope screen 27 is permanently photographed on film.

The extremely rapid analysis afforded by the present invention makes it possible to monitor a process stream, for instance, by repetitively sampling the stream at short intervals. As shown in Fig. 6, the sample injection means 21 may be adapted to be automatically actuated in cyclic fashion by a servomotor 28. The servomotor 28 also supplies a synchronizing signal to control the sweep circuit of the cathode ray oscilloscope 26, and the cathode ray beam of the oscilloscope is swept periodically at time intervals related to the period of time required for the separation of the sample components. With such an automatic arrangement, repetitive fractograms appear as a continual visual presentation.

Fig. 7 is a cross-sectional view of another form of the column of the present invention. The highly desirable results produced by the present invention can be achieved through the use of columns of noncircular cross-sections. The column illustrated by Fig. 7 is substantially rectangular in cross-section, and it should be noted that one dimension "a" of the rectangular form is substantially greater than its other principal dimension "b."

In accordance with the teaching of the present invention, the inner walls 29 of the noncircular column 10 are coated with a film 11 of partitioning agent. Noncircular embodiments of the column of the present invention are not packed as were prior art columns, but the inner walls 29 may be coated with a dendriform material to support a liquid partitioning agent for gas-liquid separations, or the inner walls may be coated with a granular coating of adsorbing material for gas-solid separations.

Figs. 8, 9, and 10 are typical examples of the analysis information obtained through use of the present invention. The fractograms indicate the separated components of the sample as peaks at different points along the abscissa. The ordinate scale represents thermal conductivity departures from carrier gas conductivity and the abscissa represents time. The various components of a sample have different retention times in the column and emerge at intervals according to their respective retension times. The fractograms return to zero reading between sample components because only carrier gas is coming off the column at such times, for it will be recalled that the carrier gas is the reference for thermal conductivity by reason of being passed through the reference side of the detector before entering the column, and carrier gas compared to itself therefore registers zero departure.

The fractogram 30 of Fig. 8 indicates separated sample components as represented by the succeeding peaks reading from left to right: air 31, acetone 32, carbon disulphide 33, methol alcohol 34, and methylene chloride 35. This fractogram was obtained from a column which was 32 feet long and had an inside diameter of 10 thousandths of an inch and was operated at a carrier gas pressure of 15 p.s.i.

Fig. 9 is a reproduction of a fractogram 36 in which the separated sample components represented by the peaks reading from left to right are air 37, N-pentane 38, acetone 39, carbon disulphide 40, methol alcohol 41, and methylene chloride 42. The fractogram 36 was obtained from a column 32 feet long, having an inside diameter of 10 thousandths of an inch and operated at a carrier gas pressure of 35 p.s.i.

Fig. 10 represents a factogram 43 in which the separated sample components reading from left to right are air 44, acetone 45, and methylene chloride 46. The fractogram 43 was obtained with a column 16 feet long, having an inside diameter of 10 thousandths of an inch and operated at a carrier gas pressure of 10 p.s.i.

The abscissa scaler increments indicated on the fractograms 30, 36, and 43 are of one second each, and it can be seen that in Figs. 8 and 9 the analysis was completed in ten seconds, whereas in Fig. 10 the complete analysis was accomplished in six seconds. Although a cathode ray oscilloscope arrangement has been found to be advantageous in conjunction with some uses of the present invention, other high speed recording means may be used.

If it is desired to monitor one or more constituents of the sample, means may be provided for detecting the trend of a component concentration. Well-known gating techniques or other means may be employed to present a visual indication of the trend of any particular sample component from an established norm or desired concentration.

It should be appreciated that the present invention affords sample analysis of either gas or liquid samples by vapor fractometry principles which is so rapid as contrasted to conventional analysis time that, for many practical purposes, the analysis is accomplished instantaneously and, when conducted on a repetitive basis, provides continual analysis information.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. An apparatus for separating a sample into its constituents in accordance with their physical characteristics, comprising a source of carrier gas, means connected to said source adapted to define a stream of the carrier gas, means for introducing the sample into a stream of the carrier gas, means for detecting separated components of the sample, and a chromatographic column defining a path for the gas stream between the point of introduction of the sample and the detector, said column comprising a tube defining a single, attenuated, unobstructed passage, said passage being internally coated with the stationary phase comprising a substance for which the different components of a sample to be analyzed have different affinities.

2. Apparatus as defined in claim 1 wherein the stationary phase comprises a partitioning material.

3. Apparatus as defined in claim 1 wherein the stationary phase comprises a liquid partitioning material.

4. Apparatus as defined in claim 1 wherein the stationary phase comprises an adsorptive material.

5. Apparatus as defined in claim 1 wherein the stationary phase comprises a solid adsorptive material.

6. Apparatus as defined in claim 1 wherein said tube has a dendriform inner surface.

7. A chromatographic column for the separation of the components of mixtures of gases and vapors by stationary phase-moving phase elution chromatography comprising a tube, there being an unobstructed path along the axis of said tube, the internal surface of said tube being coated with the stationary phase comprising a substance for which the different components of the moving phase to be analyzed have different attractions, said column being adapted to be connected in a gas chromatographic system, the lateral internal dimension of said tube being in such relation to the effective thickness of the coating of substance that components of the moving phase passing through the tube are detained within the tube for characteristically different periods of time to emerge separately from the terminus of the column.

8. Apparatus in accordance with claim 8 in which the column has a noncircular cross-section.

9. Apparatus in accordance with claim 8 in which said noncircular cross-section is rectangular.

10. A chromatographic column as defined in claim 8 wherein the stationary phase comprises a partitioning material.

11. A chromatographic column as defined in claim 8 wherein the stationary phase comprises an adsorptive material.

12. An apparatus for separating a sample into its components in accordance with their physical characteristics, comprising a source of carrier gas, means connected to said source adapted to define a stream of the carrier gas, means for introducing the sample into the stream of carrier gas, means for detecting separated components of the sample and a chromatographic column defining a path for the gas stream between the point of introduction of the sample and the detector means, said column comprising tubular means, there being a single attenuated unobstructed passage within said tubular means along the axis thereof, the lateral exposed surfaces bounding the passage comprising an adsorptive material for which the different components of a sample to be analyzed have different attractions whereby components of a sample are detained within the tubular means for characteristically different periods of time to emerge separately from the terminus of the column.

13. An apparatus for separating a sample into its constituents in accordance with their physical characteristics, comprising a source of carrier gas, means connected to said source adapted to define a stream of the carrier gas, means for introducing the sample into a stream of the carrier gas, means for detecting separated components of the sample, and a column defining a path for the gas stream between the source following the point of introduction of the sample and the detector, said column comprising a tube internally coated with a film of partitioning agent, the lateral dimensions of the stream within the column being in such relation to the pressure of the carrier gas and to the thickness of the film of partitioning agent that the rate of diffusion of the sample across the carrier gas stream is substantially of the order of the rate of diffusion of the sample in the partitioning agent.

14. An apparatus for separating a sample into its constituents in accordance with their physical characteristics, comprising a source of carrier gas, means connected to said source adapted to define a stream of the carrier gas, means for introducing the sample into a stream of the carrier gas, means for detecting separated components of the sample, and a column defining a path for the gas stream between the source following the point of introduction of the sample and the detector, said column comprising a tube supporting an aggregate of solid particles coated with a film of a partitioning agent, the thickness of this aggregate being small when compared to the internal diameter of said tube, the free space between said solid particles being at least as large as the volume of said solid particles.

15. An apparatus for determining the constituents of a sample in accordance with their physical characteristics comprising a source of carrier gas, means connected to said source adapted to define a stream of the carrier gas, means for introducing the sample into a stream of the carrier gas, a column defining a path for the gas stream following the point of introduction of the sample, said column comprising a tube internally coated with a film of partitioning agent, a detector connected to said column for measuring a characteristic parameter of the gas stream emerging from said column, and means for recording the output of said detector.

16. An apparatus for determining the constituents of a sample in accordance with their physical characteristics comprising a source of carrier gas, means connected to said source adapted to define a stream of the carrier gas, means for introducing the sample into a stream of the carrier gas, a column defining a path for the gas stream following the point of introduction of the sample, said column comprising a tube internally coated with a film of partitioning agent, a detector connected to the output of said column and adapted to produce an electrical signal commensurate with a physical parameter of said carrier gas with said constituents in it, and an oscilloscope connected to receive said electrical signal for producing a visual representation thereof.

17. A gas chromatographic column comprising a tube, there being an unobstructed path along the axis of the tube, the internally exposed surface of said tube being coated with a thin layer of a partitioning substance having different attractions for different components of a sample to be analyzed, said tube being adapted to define a path for a stream of carrier and sample gas of a chromatographic system, means for detecting separated components of a sample and means connecting said column to said detecting means.

18. In apparatus for the separation of the components of mixtures of gases and vapors by gas-liquid, partition-elution chromatography in which there is normally used a column having therein a vacuolated structure having on the surfaces thereof a liquid in which each of the several components of the mixture has a different solubility with the result that the several components of the mixture are detained within the structure for characteristically different periods of time to emerge separately from the terminus of the column, a partition-elution column whereby improved resolution and speed of resolution of the components are obtained, said column having a single, attenuated, unobstructed passage therethrough, the lateral surfaces bounding the passage defining a path for the carrier gas and the components of the mixture to be separated and said lateral surfaces having deposited thereon a film of liquid partitioning agent in which each of the several components of the mixture has a different solubility.

References Cited in the file of this patent

UNITED STATES PATENTS

| | | |
|---|---|---|
| 2,465,229 | Hipple | Mar. 22, 1949 |
| 2,826,908 | Skarstrom | Mar. 18, 1958 |

OTHER REFERENCES

Article: Gas Chromatography in Plant Streams (Fuller) in ISA Journal, November 1956, pp. 440–444.

UNITED STATES PATENT OFFICE
CERTIFICATE OF CORRECTION

Patent No. 2,920,478                  January 12, 1960

Marcel J. E. Golay

It is hereby certified that error appears in the printed specification of the above numbered patent requiring correction and that the said Letters Patent should read as corrected below.

Column 3, line 49, for "componetns" read -- components --; column 7, lines 59, 61, 63, and 66, for the claim reference numeral "8", each occurrence, read -- 7 --.

Signed and sealed this 28th day of June 1960.

(SEAL)
Attest:
KARL H. AXLINE
Attesting Officer

ROBERT C. WATSON
Commissioner of Patents